Patented Oct. 29, 1940

2,219,549

UNITED STATES PATENT OFFICE 2,219,549

THIOBARBITURIC ACID DERIVATIVES

Walter H. Hartung, Baltimore, Md., and Frank S. Crossley, Philadelphia, Pa., assignors to Sharp & Dohme, Incorporated, Philadelphia, Pa., a corporation of Maryland No Drawing. Original application October 15, 1936, Serial No. 105,827. Divided and this application December 20, 1939, Serial No. 310,148

6 Claims. (Cl. 260—260)

This invention relates to new derivatives of thiobarbituric acid. It relates more particularly to new primary $\Delta_1$-alkenyl thiobarbituric acids, and their salts, and to new processes for their production. These new compounds are indicated to have valuable hypnotic and anesthetic properties, with relatively low toxicity.

The compounds produced in accordance with this invention include various thiobarbituric acid derivatives in which the two hydrogens attached to the methylene carbon are replaced, one by a primary $\Delta_1$-alkenyl group, and the other by an alkyl group, an aralkyl group, an aryl group, a cyclo-hydrocarbon group, such as the cyclohexyl or cyclopentyl group, or other hydrocarbon or substituted hydrocarbon residue. The compounds may be represented by the graphic formula

in which R represents a primary $\Delta_1$-alkenyl group, which may have more than one double bond, and $R_1$ represents another hydrocarbon or substituted hydrocarbon group, which may be saturated or unsaturated, and which may have an open or closed chain. These compounds have a nitrogen-linked hydrogen capable of being replaced to form salts; and salts of the acids may be readily prepared by replacing this hydrogen by a monovalent metal, such as sodium or potassium, or an equivalent of a polyvalent metal, such as calcium or magnesium, or a nitrogen base, such as ammonia, alkylamines or dialkylamines, such as ethylamine or diethylamine, alkylnolamines, such as diethanolamine, ephedrine, cocaine, phenylpropanolamine, or the like.

These compounds may be produced by various methods. One advantageous method consists in condensing a di-ester of the corresponding malonic acid with thiourea, in the presence of sodium ethoxide at ordinary pressure. Another advantageous method consists in condensing the corresponding cyanoacetic ester with thiourea, in the presence of sodium ethoxide or the like, and subjecting the resulting imino derivative to hydrolysis to remove the imino group. When thiobarbituric acids are produced by this last method, care should be taken when hydrolyzing off the imino group to avoid replacing the sulfur atom with an oxygen atom with the production of the corresponding barbituric acid, rather than the desired thiobarbituric acid. These methods will be illustrated in specific examples, with particular reference to the production of primary $\Delta_1$-alkenyl alkyl derivatives, but the invention is not limited thereto.

Example 1.—Into a suitable reaction vessel, equipped with a stirrer, reflux condenser, and dropping funnel are placed about 200 parts of anhydrous alcohol and 23 parts of sodium are dissolved therein. 30 parts of urea and 81 parts of ethyl n-$\Delta_1$-butenyl malonic ester are then added and the mixture is refluxed for about 8 to 12 hours, with constant stirring, after which the alcohol is distilled off at reduced pressure. The residue is taken up in water, and the neutral products which it contains (amides or unused ester) are removed by extraction with ether. The ether is then distilled from the aqueous layer under reduced pressure, and the aqueous solution is cooled in an ice bath and slowly acidified with about 125–155 parts of concentrated hydrochloric acid. 5-ethyl 5-n-$\Delta_1$-butenyl barbituric acid precipitates. This product is purified by recrystallization from an appropriate solvent, such as water or aqueous alcohol. It melts at 108–109° C. The corresponding thiobarbituric acids, obtained in a similar manner, melt at 121–122° C.

If, in the process described in the preceding example, the corresponding cyanoacetic ester is used, the acidification precipitates 5-ethyl 5-n-$\Delta_1$-butenyl-4-imino barbituric acid. This imino derivative may be converted into the corresponding barbituric acid by hydrolyzing with boiling mineral acid solution, e. g., 20% hydrochloric or sulfuric acid.

If, in the process of the foregoing example, thiourea is used, in about the same molar proportion as the urea is used, the corresponding thiobarbituric acid is obtained. Similarly, where thiourea is condensed with a primary $\Delta_1$-alkenyl alkyl cyanoacetic ester, a 4-imino thiobarbituric acid is obtained, which may be hydrolyzed with boiling mineral acid to give the corresponding thiobarbituric acid, the hydrolysis being such that the sulfur atom is not replaced by an oxygen atom.

Example 2.—70 parts of isopropyl n-$\Delta_1$-butenyl cyanoacetic ester and 38 parts of thiourea are reacted in a solution of 23 parts of sodium in 200 parts of absolute alcohol as in Example 1. The reaction mixture, after the removal of alcohol and neutral products, yields on acidification an imino thiobarbituric acid, which, when treated with boiling 20% hydrochloric acid yields 5-isopropyl 5-n-$\Delta_1$-butenyl thiobarbituric acid, melting at 109–110° C.

*Example 3.*—95 parts of ethyl Δ₁-heptenyl malonic ester and 38 parts of thiourea are reacted in a solution of 23 parts of sodium in about 200 parts of absolute alcohol, as in Example 1. The 5-methyl 5-n-Δ₁-heptenyl thiobarbituric acid obtained is an oil which crystallizes with difficulty. It may be purified by distillation and boils at 118–122° C./about 1 mm.

*Example 4.*—81 parts of ethyl Δ₁-isobutenyl malonic ester and 30 parts of urea are reacted in a solution of 23 parts of sodium in about 200 parts of absolute alcohol, as in Example 1. The 5-ethyl 5-Δ₁-isobutenyl barbituric acid obtained has a melting point of 128–129° C.

*Example 5.*—84 parts of isopropyl n-Δ₁-butenyl malonic ester and 38 parts of urea are reacted in a solution of 23 parts of sodium in about 200 parts of absolute alcohol, as in Example 1. The 5-isopropyl 5-n-Δ₁-butenyl barbituric acid obtained has a melting point of 108–109° C.

*Example 6.*—55 parts of methyl n-Δ₁-butenyl malonic ester and 30 parts of urea are reacted in a solution of 23 parts of sodium in about 200 parts of absolute alcohol, as in Example 1, with the production of 5-methyl 5-n-Δ₁-butenyl barbituric acid. Thiourea gives the corresponding thiobarbituric acid.

The primary Δ₁-alkenyl alkyl malonic ester used, in accordance with the present invention, for the production of corresponding 5-alkyl 5-Δ₁-alkenyl thiobarbituric acids may be readily prepared from primary alkylidene malonic esters by the alkylation of such esters with an alkyl salt in the presence of a sodium alkoxide or the like. The primary Δ₁-alkenyl alkyl cyanoacetic esters may be readily prepared by the condensation of the corresponding primary alkylidene cyanoacetic esters with an alkyl salt in the presence of a sodium alkoxide or the like. Or both the alkyl Δ₁-alkenyl cyanoacetic esters and the malonic esters may be prepared by reacting an alkyl salt, such as an alkyl halide or sulfate, with an alkylidene malonic ester or cyanoacetic ester in an inert solvent in the presence of metallic sodium.

A wide range of primary Δ₁-alkenyl thiobarbituric acids may be prepared by the process of the present invention. Included among the new primary Δ₁-alkenyl thiobarbituric acids which may be prepared by the process of the foregoing examples are compounds in which the primary Δ₁-alkenyl group may be one of the following:

Δ₁-n-propenyl
Δ₁-butenyl (normal or iso)
Δ₁-pentenyl (normal or iso)
Δ₁-hexenyl (normal or iso)
Δ₁-heptenyl (normal or iso)
Δ₁,₃-butadienyl
Δ₁, 7-1,3-dimethyl octadienyl (Δ₁-citronellenyl) phenyl-vinyl
Δ₁-phenyl-propenyl and others, and in which the other bond of the methylene carbon may be attached to one of the following radicals:

Methyl
Ethyl
Propyl (normal or iso)
Butyl (normal, iso or secondary)
Allyl
Crotyl
Amyl (normal, iso or secondary)
Hexyl (normal, iso or secondary)
Heptyl (normal, iso or secondary)
Cyclohexyl
Cyclopentyl
Phenyl-ethyl
Benzyl
Citronellyl
Cinnamyl
and others.

These primary Δ₁-alkenyl thiobarbituric acids have a nitrogen-linked hydrogen replaceable by a metal or a nitrogen base, and hence it is possible to form salts of these acids. For example, the sodium salts, which are water soluble, may be conveniently prepared by reacting one of the free acids with an equivalent of sodium ethoxide in absolute alcohol. If the resulting salt is too soluble in alcohol to be readily separated it may be precipitated by the addition of ligroin or the like.

The term "alkyl" as used in this specification and the appended claims is to be construed in its broader sense, as including saturated and unsaturated compounds, whether straight chain or branched chain, as well as aralkyl compounds; and the term "alkenyl" is also to be construed in its broader sense, to include compounds in which the alkenyl group is straight or branched chain, including compounds in which this group contains more than one double bond, as well as aralkenyl compounds.

This application is a division of our copending application Serial No. 105,827, filed October 15, 1936.

We claim:

1. Primary 5-Δ₁-alkenyl thiobarbituric acids in which the Δ₁-alkenyl group has at least three carbon atoms.

2. Primary 5-Δ₁-alkenyl 5-alkyl thiobarbituric acids in which the Δ₁-alkenyl group has at least three carbon atoms.

3. 5-allyl 5-Δ₁-n-butenyl thiobarbituric acids.

4. Primary 5-Δ₁-alkenyl thiobarbituric acids in which the alkenyl group has at least four carbon atoms.

5. Primary 5-Δ₁-alkenyl 5-alkyl thiobarbituric acids in which the alkenyl group has at least four carbon atoms.

6. Compounds of the class consisting of primary 5-Δ₁-alkenyl thiobarbituric acids, in which the Δ₁-alkenyl group has at least three carbon atoms, and their salts.

WALTER H. HARTUNG.
FRANK S. CROSSLEY.